United States Patent [19]

Fortmann

[11] 4,082,375
[45] Apr. 4, 1978

[54] DUAL WEDGE FLUID THRUST BEARING INCLUDING WAVE SPRING

[75] Inventor: William E. Fortmann, West Simsbury, Conn.

[73] Assignee: United Technologies Corporation, Hartford, Conn.

[21] Appl. No.: 751,579

[22] Filed: Dec. 17, 1976

[51] Int. Cl.² ............................................. F16C 32/06
[52] U.S. Cl. ........................................ 308/9; 308/139; 308/160; 308/163; 308/DIG. 1
[58] Field of Search ................. 308/9, 73, 35, 26, 163, 308/168, 172, 175, 139, DIG. 1, 157, 160, 121

[56] References Cited

U.S. PATENT DOCUMENTS

| 3,142,519 | 7/1964 | Abramovitz | 308/160 |
| 3,635,534 | 1/1972 | Barnett | 308/160 X |
| 3,747,997 | 7/1973 | Winn | 308/9 |
| 3,971,602 | 7/1976 | Anderson | 308/163 X |

Primary Examiner—Trygve M. Blix
Assistant Examiner—Douglas C. Butler
Attorney, Agent, or Firm—Charles A. Warren

[57] ABSTRACT

A dual wedge thrust bearing for holding two relative rotating members in spaced relation includes a wave spring which supports both a thick flexible plate and a thin flexible plate stacked in that order between the cooperating bearing surfaces of the members. By securing the leading edge of the thin plate to the member on which the wave spring rests and in spaced relation to the cooperating bearing surface, a wedge-shaped passage is formed to create a fluid bearing which is efficient for low speeds and loads. At high speeds and loads, when the thin plate would have sagged making an inefficient wedge, the thick plate deflects against the spring at its leading edge to form a more efficient wedge-shaped opening between it and the cooperating bearing surface.

9 Claims, 5 Drawing Figures

DUAL WEDGE FLUID THRUST BEARING INCLUDING WAVE SPRING

BACKGROUND OF THE INVENTION

In hydrodynamic foil bearings, it is desirable to create a thick fluid film to minimize surface wear. The angle of the wedge-shaped entrance gap between the relatively moving surfaces should be very low to build up as thick a film as possible. In the type of thrust bearing under consideration, a relatively thin plate which is satisfactory for forming an efficient wedge at low loads will not retain its shape at high loads and a steeper, less efficient wedge results. Supplementing the thin plate with a thicker plate for high load regions of operation permits a formation of thicker films and longer bearing life.

SUMMARY OF THE INVENTION

A feature of this invention is the use of overlapping foil segments, one of which is thinner and flexible than the other, with the thinner foil positioned to form an efficient wedge pocket at low speeds and loads, and the thicker foil moving against the supporting spring pad to form an efficient wedge pocket at high speeds and loads.

Another feature is an extension of the thicker foil beyond the supporting wave spring pad so that conversion from the thick wedge to the thin wedge occurs gradually as the speed and load increases.

According to the invention, the bearing includes a wave spring pad resting on the nonrotating member and this element supports a thick foil plate in underlying relation to a thin foil plate. The latter extends beyond the thick plate and has its end secured in spaced relationship to the nonrotating surface. The thin foil plate is held in contact with the runner by the thick foil plate over the area of the thick foil plate. The extending portion of the thin foil plate forms the desired efficient wedge-shaped pocket for the bearing fluid at lift-off and low speeds, and as the members accelerate to higher speeds and at higher loads the film pressure over the thick plate forces the leading end of the thick plate away from the cooperating runner surface to produce the relatively thin wedge angle desired.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 2:
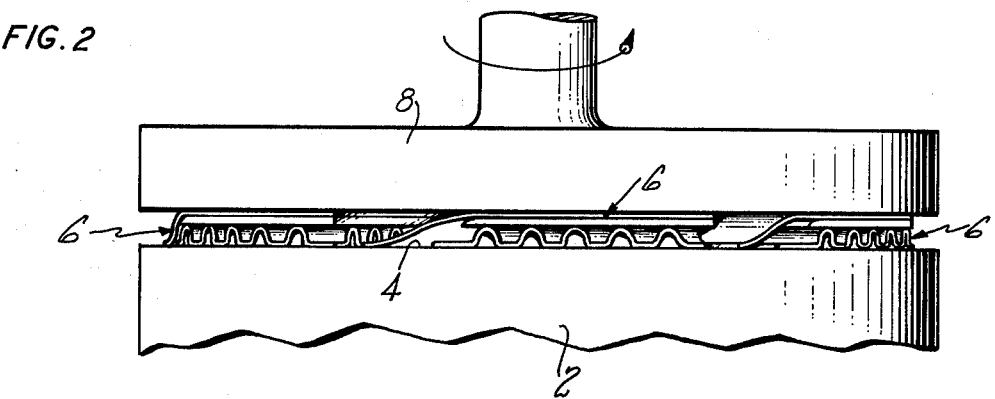
FIG. 2 is an elevation of the bearing of FIG. 1.

Referring to the drawing, the bearing construction is shown as being positioned between a fixed base or supporting member 2 having an annular bearing surface 4 on which the several bearing assemblies 6 are positioned. These segmental bearing assemblies support a rotary member 8 positioned over the member 2 and having an annular cooperating bearing or runner surface 10, FIG. 2, concentric to the surface 4 and positioned above and in spaced relation thereto.

Positioned between the runner surfaces are several of these segmental bearing assemblies 6 spaced around the axes of the members as shown to hold the members in spaced relation and to carry the axial load between the members during operation of the mechanism in which the bearing structure is incorporated. The bearing assembly and its relation to the members 2 and 8 will be described in its operation as an air bearing but it will be understood that other fluids may be used where the speeds and loads permit or require such other fluids.

Each bearing insert assembly includes a wave or corrugated spring pad 12, one edge of which is fastened to 2 by welding or other suitable means, the corrugations of which extend away from said welded edge, that is to say generally transverse to the direction of movement of the runner surface of the rotary member 8. This spring pad rests on the stationary surface 4 and supports a thick foil plate 16 in spaced relation to the bearing surface 4. This plate is positioned and held on the spring pad by attachment thereto or by attachment to any other stationary element such as members 2 or a thin overlying plate 20. The plate 16 overhangs the spring pad at the leading end 18, as shown, such that this end of the plate will be deflected downwardly in operation to form a wedge as will appear later.

Positioned on the thick foil plate 16 and between this plate and the runner surface 10 and, when the bearing is not in operation, in engagement with both is a thin foil plate 20. At the trailing ends both plates are coextensive. The leading end 22 of the thin plate extends significantly beyond the leading end 18 of the thick plate, and is permanently attached to the member 2, this latter supporting the end 22 in spaced relation to the runner surface 10 so as to form the wide end of the wedge-shaped pocket 26 between this foil plate and the facing runner or bearing surface.

Figure 1:
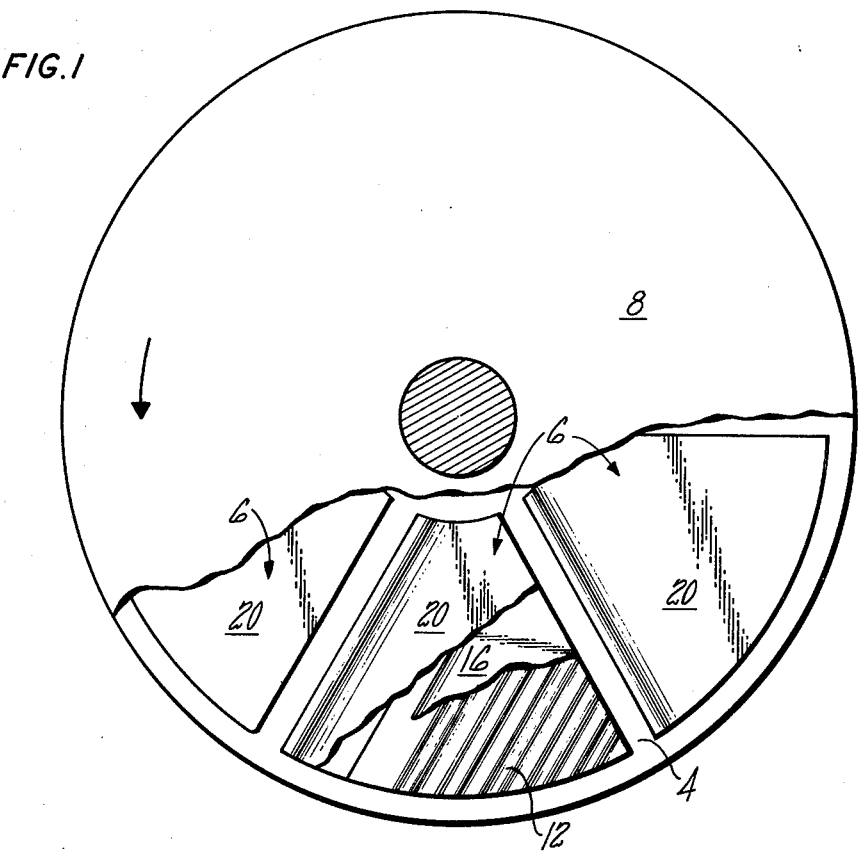
FIG. 1 is a plan view of the device with parts broken away.

As best shown in FIG. 1, the wave spring pad, the thin plate 20 and thick plate 16 are all segment shape and thus each bearing insert fills a segmental portion of the space between the bearing surfaces. This arrangement permits the attachment of the wave pad to the bearing surface on the base 2 and also the attachment of the thin plate to this same surface.

Figure 3:
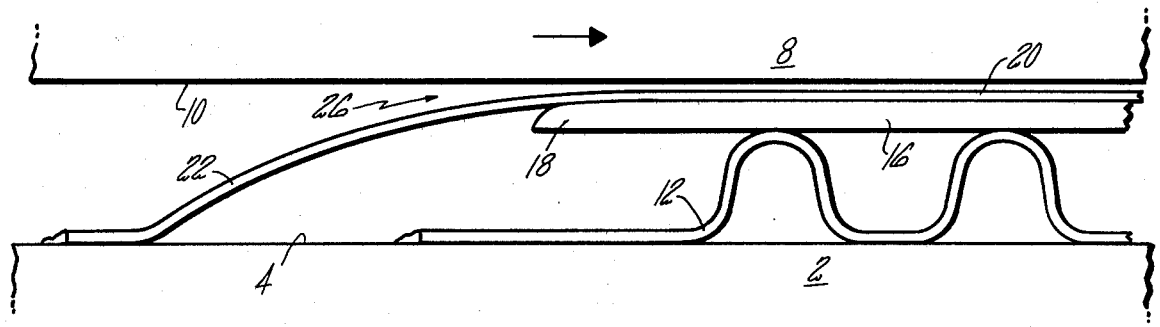
FIG. 3 is an enlargement of part of FIG. 2 and shows low speed/low load operation.

At low speeds and loads, the parts are in the position of FIG. 3, with the thin foil providing an efficient wedge to maximize fluid film thickness between the plate 20 and the cooperating bearing surface 10. At this time the thick foil plate is parallel to the runner surface 10 as shown and there is a generally uniform low fluid pressure between the portion of the thin plate coextensive with the thick plate and the cooperating runner surface as shown in FIG. 3 and by the curve 28 of FIG. 5, so that the plate 20 is held in spaced relation to the bearing surface 10 by the fluid film therebetween.

Figure 4:
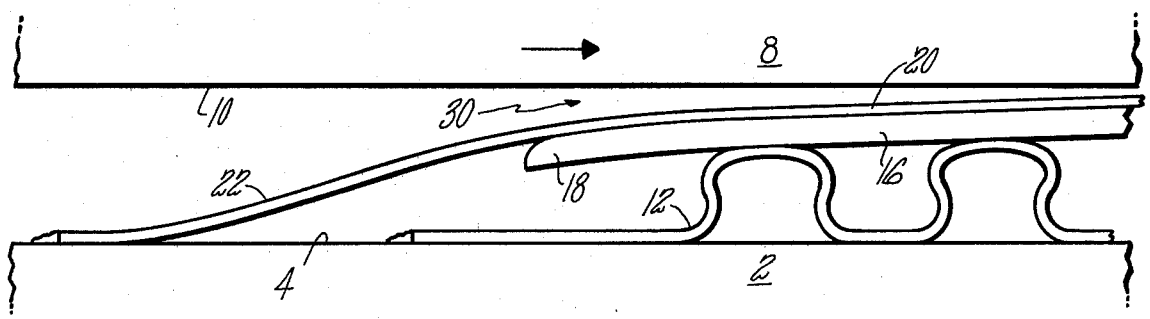
FIG. 4 is an enlargement of part of FIG. 2 and shows high speed/high load operation.

As the rotational speed and load increase, the wave of the spring pad nearest to the overhanging end of the thick foil plate is overloaded and the parts reach the configuration of FIG. 4. It will be seen that the thick foil plate flexes so that a thin wedge-shaped pocket 30 is formed between the part of the thin plate overlying the portion of the thick foil plate and the runner. This thin wedge develops the necessary high pressure in the supporting fluid to carry the high load with a thick air film. Had the thin foil been required to build up this higher required pressure it would have deflected resulting in an inefficient, precipitous wedge with an attendant thin air film.

Figure 5:
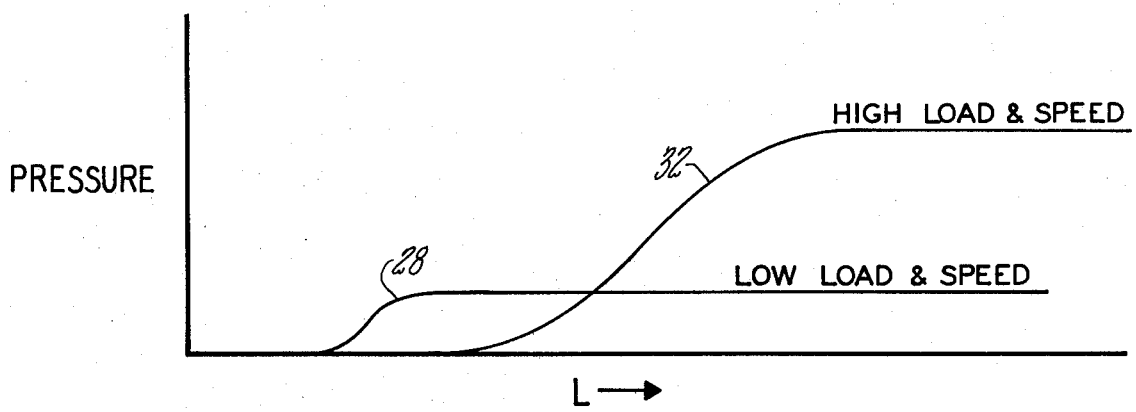
FIG. 5 is a curve showing film pressure distribution.

At this speed and load the pressure distribution is shown by the curve 32 of FIG. 5. For the portion of the thick plate back of the second wave in the spring, the plate remains parallel to the cooperating runner surface with an attendant constant high pressure in the supporting fluid as shown. The thick plate is sufficiently flexible and its forward end sufficiently overhung to permit the forward part of the plate to bend to produce the desired wedge angle. Obviously, the resiliency of the wave spring is controlled to produce the desired thin wedge angle.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A thrust bearing including:
 a base member having a bearing surface thereon;
 a supported member above said base member and having a cooperative bearing surface spaced above the bearing surface on the base member, the members being relatively rotatable; and
 a bearing insert assembly positioned between said bearing surfaces and including:
 a resilient wave-shaped element resting on the first bearing surface,
 a relatively thick flexible plate resting on and supported by said wave-shaped element in spaced relation to the first bearing surface, and
 a relatively thin plate on said thick plate and between said thick plate and said second bearing surface, said thin plate having a leading end extending forwardly in the direction of relative rotation beyond the thick plate, and being attached at this leading end to the first bearing surface.

2. A thrust bearing as in claim 1 in which the forward attached end of the thin plate is spaced from the second bearing surface to form a wedge opening therebetween.

3. A thrust bearing as in claim 1 in which the thick plate overhangs the wave element at the end nearer the attached end of the thin plate.

4. A thrust bearing as in claim 1 in which the bearing surfaces are annular surfaces having a common axis, and the supported member rotates on the same axis.

5. A thrust bearing for positioning between two relatively rotating members to hold them in spaced relation including:
 a first member having an annular bearing surface thereon;
 a second member rotatable with respect to the first member and having an opposing annular bearing surface, said annular surfaces being coaxial and parallel to one another and coaxial with the axis of rotation of said second member; and
 at least one thrust bearing assembly positioned between said surfaces to hold them in spaced relation, said assembly including:
 a wave spring engaging and resting against the bearing surface of the first element,
 a thick flexible plate resting on said wave spring and positioned between said spring and the second member and having a leading edge with respect to the relative rotation between the members, and
 a thin flexible plate on said thick plate and positioned between the thick plate and the opposing annular bearing surface and resting on the thick plate, said thin plate having a leading end extending beyond the leading edge of the thick plate and being secured at this end to the first member, being beyond the leading edge of the thick plate.

6. A bearing as in claim 5 in which the secured end of the thin plate is the leading end, with respect to the relative rotation and is in spaced relation to the second member to form a wedge therebetween.

7. A bearing as in claim 6 in which the leading edge of the thick plate with respect to the relative rotation projects beyond the wave spring.

8. A thrust bearing including:
 a first member having an annular bearing surface;
 a second member rotatable with respect to the first member and having an opposing annular bearing surface, said annular surfaces being coaxial and parallel to one another and coaxial with the axis of rotation of said second member; and
 a plurality of thrust bearing assemblies positioned between said surfaces in peripherally spaced relation to hold them in spaced relation, each assembly including:
 a wave spring engaging with and resting on the bearing surface on the first member,
 a thick flexible plate resting on said wave spring and positioned between the wave spring and the second member and having a leading edge with respect to the direction of rotation, and
 a thin flexible plate on said thick plate and thinner than said thick plate and positioned between the thick plate and the second member, said thin plate having a leading end extending beyond the leading edge of the thick plate and being secured at this end to the first member to hold this end in spaced relation to the bearing surface on the second member.

9. A bearing as in claim 8 in which the leading edge of the thick plate projects beyond the wave spring.

* * * * *